United States Patent
Markey et al.

(10) Patent No.: US 10,580,095 B2
(45) Date of Patent: Mar. 3, 2020

(54) METHOD AND SYSTEM FOR WATER PRODUCTION AND DISTRIBUTION CONTROL

(71) Applicant: Accenture Global Solutions Limited, Dublin (IE)

(72) Inventors: Nigel Robert Markey, Woking (GB); Madhur Sharma, Pune (IN); Rohit Banerji, Brighton (GB)

(73) Assignee: Accenture Global Solutions Limited, Dublin (IE)

( * ) Notice: Subject to any disclaimer, the term of this patent is extended or adjusted under 35 U.S.C. 154(b) by 565 days.

(21) Appl. No.: 15/072,000

(22) Filed: Mar. 16, 2016

(65) Prior Publication Data

US 2016/0275629 A1    Sep. 22, 2016

(30) Foreign Application Priority Data

Mar. 20, 2015  (IN) .......................... 1400/CHE/2015

(51) Int. Cl.
*G06Q 10/06* (2012.01)
*G06Q 50/06* (2012.01)
*E03B 1/02* (2006.01)

(52) U.S. Cl.
CPC .............. *G06Q 50/06* (2013.01); *E03B 1/02* (2013.01); *G06Q 10/067* (2013.01); *G06Q 10/0631* (2013.01); *G06Q 10/06315* (2013.01)

(58) Field of Classification Search
CPC ............................... G06Q 10/06; G06Q 50/06
USPC ...................................................... 705/7.25
See application file for complete search history.

(56) References Cited

U.S. PATENT DOCUMENTS

| | | |
|---|---|---|
| 2004/0217654 A1 | 11/2004 | Maturana et al. |
| 2007/0192072 A1 | 8/2007 | Cullick et al. |
| 2008/0109175 A1* | 5/2008 | Michalak ............... C02F 1/008 702/50 |
| 2009/0076632 A1 | 3/2009 | Kram et al. |
| 2009/0138213 A1 | 5/2009 | Watts, III et al. |
| 2010/0217631 A1* | 8/2010 | Boss ..................... G06Q 10/06 705/7.22 |

(Continued)

FOREIGN PATENT DOCUMENTS

| | | |
|---|---|---|
| CN | 202159265 U | 3/2012 |
| CN | 202563329 U | 11/2012 |

(Continued)

OTHER PUBLICATIONS

European Search Report to EP Application No. 16161316.1, dated Jun. 28, 2016, (10p).

(Continued)

*Primary Examiner* — Nga B Nguyen
(74) *Attorney, Agent, or Firm* — Brinks Gilson & Lione

(57) ABSTRACT

A method and a system control the water production for a water distribution network. The method includes collecting field sensor data from a water distribution network, using the received data to model the water distribution network and determining an optimal water flow, and generating the optimal water production plan for controlling the water production in the water distribution network based on received data including the sensor data and the historical data. The system includes a process and memory and processor executable instructions to carry out the above method.

18 Claims, 12 Drawing Sheets

(56) References Cited

U.S. PATENT DOCUMENTS

| | | | | |
|---|---|---|---|---|
| 2011/0106328 A1* | 5/2011 | Zhou | G05B 13/024 | 700/291 |
| 2011/0215945 A1 | 9/2011 | Peleg et al. | | |
| 2011/0264282 A1* | 10/2011 | Blank | G05B 15/02 | 700/282 |
| 2012/0136496 A1* | 5/2012 | Black | H02J 3/14 | 700/291 |
| 2013/0073062 A1* | 3/2013 | Smith | G06Q 10/04 | 700/33 |
| 2013/0211797 A1* | 8/2013 | Scolnicov | G06Q 10/0639 | 703/2 |
| 2014/0046603 A1 | 2/2014 | Arya et al. | | |
| 2014/0052421 A1* | 2/2014 | Allen | G05B 17/02 | 703/2 |
| 2014/0180761 A1 | 6/2014 | Yolles et al. | | |
| 2014/0214219 A1* | 7/2014 | Katayama | G06Q 50/06 | 700/291 |
| 2014/0257584 A1* | 9/2014 | Tanimoto | G06Q 50/06 | 700/291 |

FOREIGN PATENT DOCUMENTS

| | | |
|---|---|---|
| CN | 103489053 A | 1/2014 |
| EP | 1580631 A2 | 9/2005 |
| EP | 2472467 A1 | 7/2012 |
| WO | WO2008/063554 A2 | 5/2008 |
| WO | WO 2012/036633 A1 | 3/2012 |
| WO | WO 2013/026731 A1 | 2/2013 |

OTHER PUBLICATIONS

Canada Patent Office, Office Action from Canada Patent Application No. 2,924,038 dated Sep. 21, 2017, 5 pages.

Patent Examination Report No. 1 dated Apr. 8, 2016 for Australian Patent No. 2016201751 (7 pages).

Office Action in European Application No. 16161316.1, dated Oct. 15, 2018, pp. 1-7.

Office Action and Search Report, with English Summary, in China Application No. 201610162032.0, dated Jul. 22, 2019, 7 pages.

Office Action in India Application No. 1400/CHE/2015, dated Aug. 27, 2019, 7 pages.

* cited by examiner

| | 310 | 320 | | 330 | 340 | |
|---|---|---|---|---|---|---|

Menu bar: HOME | AVAILABILITY DATA ▼ | PLAN PRODUCTION ▼ | WQ MANUAL ALERT | REPORTS ▼

Toolbar: 10 DAY PLAN TARGETS — 351 | PLAN PERIOD [9/1/2015-18/1/2015] — 356 | EXPORT PLAN | EXPORT OPTIMAL ROUTE

| SITE NAME | PLANNER BUTTON: COPY PREVIOUS: DEFAULT ML/D — 350 | UNIT COST OF WTW PRODUCTION (£/MLD) — 352 | PLANT CAPACITY (ML/D) — 353 MIN / MAX | | OPTIMAL PRODUCTION (LAST RUN) — 354 | ACTUAL 24 HR ROLLING PRODUCTION — 355 | TODAY'S DECLARED PRO | SEASONAL EXPECTED PRO AVAILABILITY (THIS MONTH) | 90 DAY BEST HISTORIC ACTUAL PRODUCTION | 358 PRO | 359 OUTAGE PLAN FRI 9/1/2015 | 360 PRO | OUTAGE PLAN SAT 10/1/2015 |
|---|---|---|---|---|---|---|---|---|---|---|---|---|---|
| | | | — 345 | — 347 | | | | | | | | | |
| PLANT 1 | | £142.77 | 0 | 10 | 3.00 | 2.25 | | | 7.0 | 7.0 | 2.81 | | 7.0 |
| PLANT 2 | | £23.05 | 450 | 700 | 680.00 | 681.65 | | | 680.0 | 680.0 | 699.01 | | 680.0 |
| PLANT 3 | | £49.99 | 0 | 8 | 0.00 | 0.01 | | | 0.0 | 0.0 | 0.21 | | 0.0 |
| PLANT 4 | | £48.28 | 0 | 36 | 25.60 | 26.53 | | | 28.0 | 28.7 | 29.99 | | 28.0 |
| PLANT 5 | | £60.00 | 0 | 13 | 0.00 | 1.40 | | | 0.0 | 0.0 | 20.36 | | 0.0 |
| PLANT 6 | | £45.69 | 0 | 23 | 12.30 | 17.94 | | | 18.0 | 15.5 | 18.00 | | 18.0 |
| | TOTALS: | | 1395.0 | 2924.0 | 2086.6 | 2113.04 | | | 2165.3 | 2320.6 | TOTAL OUTPUT (ML/D) | | 2179.8 |

— 346

| | | 371 | | |
|---|---|---|---|---|
| £69338.14 | £68512.13 | TOTAL COST OF PRODUCTION (£/DAY) | PRODUCTION REQUIREMENT | — 372 |
| £33.23 | £32.42 | TOTAL PRODUCTION UNIT COST (£/MLD) | FORECAST DEMAND (ML/D) | — 374 |
| £0.0 | £120652.41 | 373 — SYSTEM COST (£/DAY) | PRODUCTION UNIT COST (£/MLD) | — 376 |
| £0.0 | £57.1 | 375 — SYSTEM UNIT COST (£/MLD) | HEADROOM (ML/D) | — 378 / — 380 |
| | 147.36 | 377 — SE WELLS PRODUCTION TOTAL (ML/D) | SE WELLS PLAN TOTAL (ML/D) | 172.19999 |
| TODAY'S HEADROOM (ML/D) 381 | 379 | | OVERALL STRATEGIC SRES STORAGE (%) | — 382 |
| HEADROOM (MAX TO PRO) 383 | 759 | 25.95% | SRES TOTAL STORAGE CAPACITY IN-SERVICE (ML) | — 384 |
| HEADROOM (PRO TO PLAN) 385 | 79 | 3.63% | SRES TOTAL ACTUAL STORAGE VOLUME (ML) | — 386 |

METHOD AND SYSTEM FOR WATER PRODUCTION AND DISTRIBUTION CONTROL

CROSS-REFERENCE TO RELATED APPLICATIONS

This application claims priority to Provisional Indian Application No.: 1400/CHE/2015, filed on Mar. 20, 2015, which is incorporated herein by reference in its entirety.

FIELD OF THE TECHNOLOGY

The disclosure relates to the field of production control, and more particularly, it relates to a method and a system for water production and distribution control.

BACKGROUND OF THE TECHNOLOGY

Water production control typically identifies future water supply needs and plans the municipal water production according to the projected needs to ensure sustainable supplies of water. Traditionally, municipal water production control approaches are driven by demand. The traditional municipal water production controls do not use the current actual field sensor data of the water distribution network, and are not able to handle changes in the established network topology in real time. As such, there are technical problems to be resolved in order to control the municipal water production by using the real time field sensor data and incorporating real time changes of the network topology into the municipal water production control.

SUMMARY

Examples of the present disclosure provide at least a method and a system for municipal water production and distribution control.

A method may be provided for municipal water production and distribution control. The method may include steps of querying, at a pre-determined time interval, sensor data stored in an industrial control database, receiving the sensor data and assigning a validity period for the received sensor data, receiving user data from a first user interface wherein the user data represents a demand for water, querying historical data comprising historical asset attributes and historical sensor data from a historical data repository, modeling the water distribution network as nodes and connections between nodes, determining constraints and dependencies among the nodes in the water distribution network, determining costs of water production for the water distribution network, and adding a slack variable when a demand for water exceeds a supply of water to the nodes.

The method may further include steps of determining, at a pre-determined frequency, an optimal water flow in the modeled water distribution comprising selected connections between selected nodes according to the constraints and the dependencies by using the costs of water production, the slack variable, the received sensor data within the validity period, the user data and the historical data, and determining a water production plan for the water distribution network according to the determined optimal water flow and displaying the water production plan in a second user interface.

The present disclosure provides a system for municipal water production and distribution control. The system may include a processor and a non-transitory computer readable medium storing computer instructions configured to cause the processor to: query, at a pre-determined time interval, sensor data stored in an industrial control database, receive the sensor data and assign a validity period for the received sensor data, receive user data from a first user interface wherein the user data represents a demand for water, query historical data comprising historical asset attributes and historical sensor data from a historical data repository, model the water distribution network as nodes and connections between nodes, determine constraints and dependencies among the nodes in the water distribution network, determine costs of water production for the water distribution network, and add a slack variable when a demand for water exceeds a supply of water to the nodes.

The computer instructions included in the system may also cause the processor to determine, at a pre-determined frequency, an optimal water flow in the modeled water distribution comprising selected connections between selected nodes according to the constraints and the dependencies by using the costs of water production, the slack variable, the received sensor data within the validity period, the user data and the historical data, and determine a water production plan for the water distribution network according to the determined optimal water flow and displaying the water production plan in a second user interface.

BRIEF DESCRIPTION OF THE DRAWINGS

The system and/or method may be better understood with reference to the following figures and descriptions. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION OF ILLUSTRATED EXAMPLES

Figure 1:
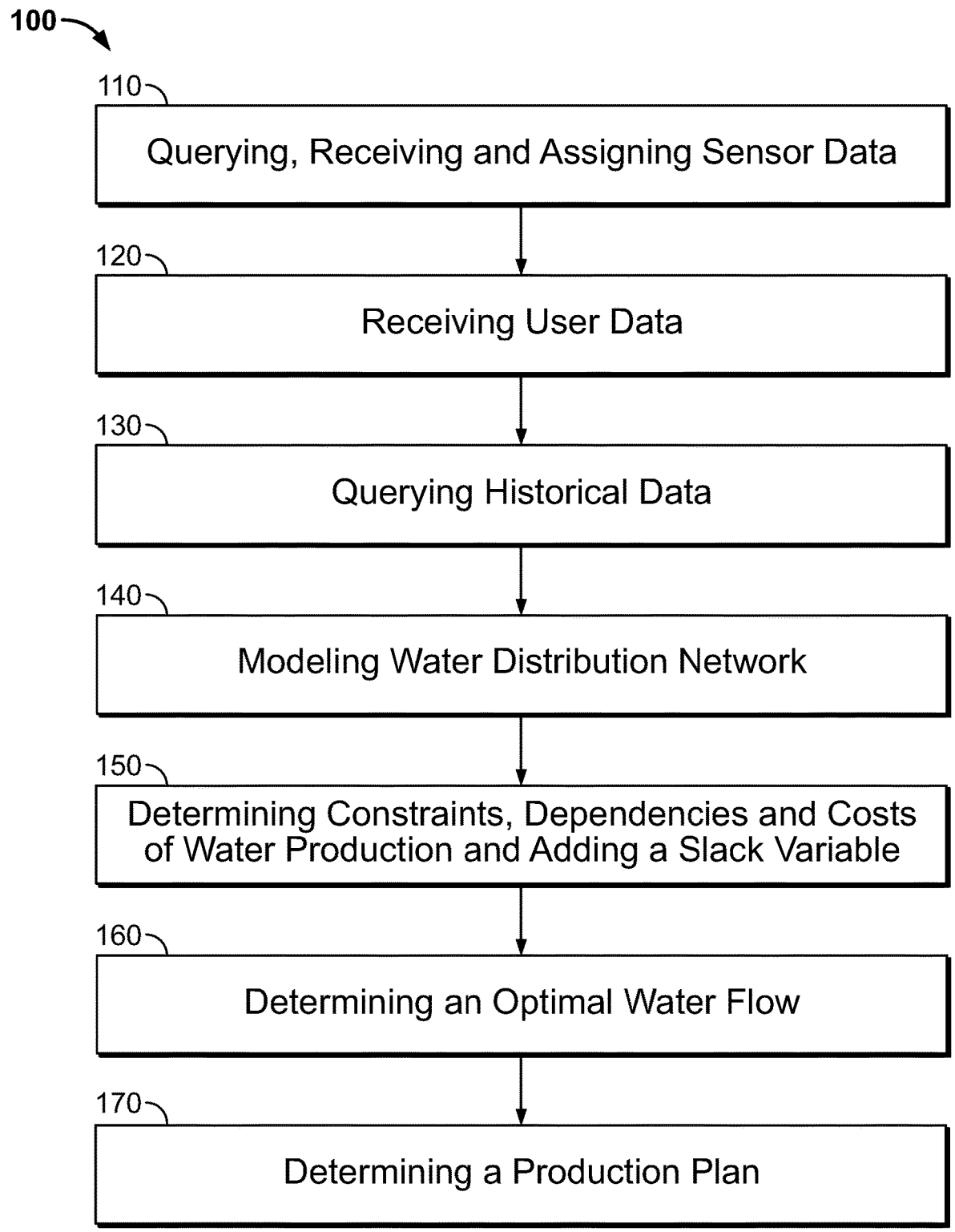
FIG. 1 is a flowchart of one embodiment of a method for water production control for a water distribution network.

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

Reference throughout this specification to "one example," "an example," "examples," "one embodiment," "an embodiment," "example embodiment," or the like in the singular or plural means that one or more particular features, structures, or characteristics described in connection with an embodiment or an example is included in at least one embodiment or one example of the present disclosure. Thus, the appearances of the phrases "in one embodiment," "in an embodiment," "in an example embodiment," "in one example," "in an example," or the like in the singular or plural in various places throughout this specification are not necessarily all referring to the same embodiment or a single embodiment. Furthermore, the particular features, structures, or characteristics may be combined in any suitable manner in one or more embodiments or examples.

The terminology used in the description herein is for the purpose of describing particular examples only and is not intended to be limiting. As used herein, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The described communication between devices may include any appropriate type of communication network for providing network connections to the server and client or among multiple servers or clients. For example, communication network may include the Internet or other types of computer networks or telecommunication networks, either wired or wireless. In embodiments, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client may be stationary or mobile.

A server, as used herein, may refer to one or more server computers configured to provide certain server functionalities, such as database management and search engines. A server may also include one or more processors to execute computer programs in parallel.

It should be noticed that, the embodiments/examples and the features in the embodiments/examples may be combined with each other in a no conflict condition. The inventive aspects will become apparent from the following detailed description when taken in conjunction with the accompanying drawings.

It should be noticed that, the steps illustrated in the flowchart of the drawings may be performed in a set of computer devices using executable program code. And the order of the steps may be different from that in the drawings under some status, although an example logic order is shown in the flowchart.

The purpose, technical proposal and advantages in the examples of the present disclosure will be clear and complete from the following detailed description when taken in conjunction with the appended drawings. The examples described thereinafter are merely a part of examples of the present disclosure, not all examples. Persons skilled in the art can obtain all other examples without creative works, based on these examples.

Optimal control of municipal water production and distribution operations in water supply networks is one of the most challenging problems in production planning. Traditional water production control approaches are driven by demand and not cost. Traditional plans are not created using the current actual or historic performance data of the network. Traditional approaches can't handle changes in the Network Topology over time. Traditional plans do not take into account recent historic data in their Analytical Models.

The present disclosure discloses a water production control method and system for water production control within a water network. The present disclosure discloses water production control by using a combination of data that is real time, historic, user input, configured data and unchanging static constants. The present disclosure also discloses the topological structure of the network that may not be pre-specified and may be changed over time. The network optimization disclosed herein utilizes a two stage linear programming model. Data for feeding the model may include the combination of real time data, historic data and user input data, configured data and unchanging static data. A graphical user interface may be provided and may be used by a water production planner to adjust parameters that are fed into the model.

FIG. 1 is a flowchart of one embodiment of a method for water production control for a water distribution network 100. Steps shown in FIG. 1 may be performed by one or more processors to execute instructions stored in non-transitory computer readable medium.

Step 110: Querying, receiving and assigning sensor data. Examples of step 110 may include: querying, at a predetermined time interval, sensor data stored in an industrial control database, and receiving the sensor data and assigning a validity period for the received sensor data.

The sensor data may be queried based on an asset. In order to model the water supply network, each node on the water supply network may be represented as an asset. For example, a pumping station may be an asset. Each asset may have one or more sensors that may collect data for the asset. The sensors may describe the characteristic (attribute) of the asset. The pumping station may have a sensor to collect data for the volume of water every minute. After the sensor collects the data for the asset, the sensor data may be stored in a database such as an industrial control database. An identification of the asset may associate with the sensor data stored in the database. One sensor may be for one or more assets, and one asset may have one or more sensors. Assets may be categorized into higher level groupings calling meta assets. The common attributes may exist for the meta asset. The attributes of assets may be represented by using the sensor data. As such, the sensor data may be obtained according to the asset or an identification of an asset.

The sensor data collected and used in the present disclosure may be a subset of the sensor data that can be collected. For example, the sensor data may provide details regarding how water flows through a pipe. Because the water flow may vary in time and location, the sensor data for depicting the water flow may include data to reflect various water flows through the water distribution network representing various consumption scenarios, and such data may be complicated. However, the methods disclosed in the present disclosure may focus on analyzing the water supply capacity, rather than only flows. Thus, the method disclosed may define the hydraulic water flow as constraint, while using none or a subset of the sensor data. Such method does not need complete details of the hydraulic water flow through the water distribution network. As such, only a portion of the sensor data may be used in the current disclosed method.

The sensor data may be queried at a pre-determined time interval. The sensor data may be collected and stored dynamically. The sensor may collect the sensor data on a real time basis. The sensor data may be stored to the industrial control database as soon as the sensor collects the sensor data. As the sensor data may be changed over time, for example, the volume of water for a pumping station may be change every minute, therefore, the latest sensor data may be obtained by querying for the sensor data periodically. For example, querying the sensor data from the database every fifteen (15) minutes. The sensor data may be obtained directly from sensors directly. The frequency for getting sensor data directly from the sensor may be same or different from the frequency to query the sensor data form the database.

A validity period for the sensor data may be assigned. When sensor data are received, a "valid lifetime" may be set for that sensor data. By this way, data vitality issues may be handled. For example, if a signal can operate within a certain range of possible values, but the connection is lost to a data source (the industrial control database for example), the validity period may be used to assume (dependent on standard deviation, etc.) how long the last data point may be valid for. Even so, when data quality issues may become a problem, a notification may be generated and sent to the user to inform that there may be issues with the data quality. The validity period may also be set for other types of data in addition to the sensor data. For example, the validity period may be set for the historical data, the user input data and/or configured data.

Step 120: Receiving user data. Examples of step 120 may include: receiving user data from a first user interface wherein the user data represents a demand for water.

The user may choose to enter the user data representing a demand of water via a graphical user interface (GUI). For example, a GUI may be developed to allow the user to enter water demand for one day or for a number of days. The user may enter different water quantities for different days. The user entered water demand may be stored in a database as soon as the user enters the demand value in the GUI. The user data may be retrieved at the real time basis. The user data may be used for water production control along with the sensor data and other data.

The configured data may also be retrieved. The water production planner may choose to edit the production plan by adjusting different parameters that may affect the water production control. The different parameters may be sensor data, user data or any other data created for controlling the water production. The adjusted parameters may be saved and retrieved as the configured data. The configured data may be retrieved from the database in real time as soon as they are created.

Step 130: Querying historical data. Examples for step 130 may include: querying historical data comprising historical asset attributes and historical sensor data from a historical data repository.

Historical data may include different types of data. The historical data may include asset attributes that may be created by sensors after a certain period of time. The asset attributes may also be from other sources such as from the manufacturer of the asset. The historical data may include the sensor data after the sensor data are created after a pre-determined period of time. The historical data may also include user data and configured data after they become old enough. The pre-determined time period determines whether a sensor data record, a user data record or a configured data record may be considered historical data. The pre-determine time period may vary, it may be fifteen (15) minutes or twenty four (24) hours, or may be even weeks or months. Different historical data may have different pre-determined period for the determination. For example, the sensor data may become historical data fifteen (15) minutes after they are created while the user data may become historical data thirty (30) minutes after they are created. The historical data may be stored in one or more historical data repositories or databases.

Step 140: Modeling water distribution network. Examples of step 140 may include: modeling the water distribution network as nodes and connections between nodes.

The model of water distribution network may include nodes and connections between nodes. Each node representing an Asset may be defined as a variable. The variable may also represent a pipe connection that may link nodes together in the network. Network topology may not be specified beforehand. The network topology may be changed dynamically. A model may be built to have the necessary mathematics from this topology. Constraints and dependencies for the nodes and connections in the network may be represented by using variables in the model. A linear program may be used to optimize the model at run time. The linear program may incorporate changes in the physical network topology and characteristics when optimizing the model. The optimized model thus may reflect dynamic changes in the network topology.

The model of a water distribution network disclosed herein may simplify the model optimization. The disclosed model may focus on the water supply capacity and may depict the hydraulic water flows as constraints. By comparing with the traditional model that predicts the hydraulic water flow, the disclosed model of water distribution network may not need to factor in details regarding how water flows in the water supply system. The disclosed model may merely define variables for each node and pipe connections that link nodes together. As such, the disclosed model may not need details how the hydraulic water flows. The hydraulic water flows in the disclosed model may be merely constraints. The disclosed model may thus be easier to construct in comparison with constructing a hydraulic water flow model.

Because the disclosed model may treat the hydraulic flow as a constraint, the disclosed model of a water distribution network may also be easy to maintain. For example, when there is a change for the hydraulic water flow, such as a pump failure, the disclosed model may not need the details of the change of the hydraulic water flow. The hydraulic water flow change may be reflected by a variable change in the disclosed model. The disclosed model may be quickly rebuilt by reading the changed real-time data. Compared with a traditional hydraulic flow model, which may take about three to six months to be rebuilt in case the hydraulic water flow changes, the disclosed model may be reconstructed in five to ten minutes. Therefore, by using the disclosed model, the water production control system with the rebuilt model may be implemented within two days.

The initial build of the disclosed model may be easily done, because the disclosed model may not need the hydraulic water flow details of the water supply. The disclosed model may be built by using merely a subset of the sensor data that may be collected and stored. The disclosed model may thus be pre-calculated and be built by using a subset of historical sensor data. Accordingly, compared with the traditional hydraulic water flow model, the initial build of the disclosed model may be completed in less time.

Step 150: Determining constraints, dependencies and costs of water production and adding a slack variable. Examples for step 150 may include: determining constraints and dependencies among the nodes in the water distribution network, determining costs of water production for the water distribution network, and adding a slack variable when a demand for water exceeds a supply of water to the nodes.

Constraints and dependencies among the nodes in the water distribution network may be determined. After the sensor data, historical data, configured data and the user data are obtained by either querying from the database or directly receiving from sensors or the user interfaces, equations may be built to reflect the data relationships. Constraints may be imposed. For example, the abstraction limit may be a constraint for the abstraction points of the water distribution network. The constraints may be reflected in the equations.

The constraints may be variables in the equations. For example, the water abstraction is the process of taking water from any source, either temporarily or permanently. The license limit constraints may be imposed for abstraction points. There may be many abstraction points in the water distribution network. Each abstraction point may have a license limit for the water extraction. To reflect constraints in the equations, the license limit constraints may be imposed as a variable on abstraction points when creating the equations. The license limit constraints may be used when an optimizer performs the linear program optimization for the water distribution network.

Constraints may be user configured. For example, a super user may configure the data to set the maximum and minimum water flow for a particular pipe connection.

Dependencies may exist between nodes in the water distribution network. For example, the water supply for one user may not come from a particular pumping station. Dependencies may limit the connections in the water distribution network. Dependencies may also be incorporated into the equations for the optimizer to perform the linear program optimization.

Water production costs may be calculated. The unit cost for water production for each water treatment works (WTW) may be calculated by using the following formula (1):

$$\text{Unit cost} = \text{Sum Product}(\text{WTW flow}, \text{Real Time unit cost})/\text{Total WTW Production per day} \quad (1)$$

A slack variable may be added when a demand for water exceeds a supply of water to the nodes. If a water distribution model does not meet the demand for water, the equation in the model may become infeasible to hold and the mathematical model may fail. In order to solve this problem, a slack variable may be added. The slack variable may capture the amount of demand that may be met due to the constraints or dependencies. Then, during the running of the linear program optimization, the optimizer may try to source the demand from that slack variable. As a consequence, the slack variable may be used to determine how much water may need to be sourced from the slack variable. Because of the use of the slack variable, it may be feasible to solve the equation. Further, the slack variable may be used to tell how much demand may not be met.

A zone for the water distribution network may also be defined. A zone may be defined by being able to always get the water it may need.

Step 160: Determining an optimal water flow. Examples for step 160 may include: determining, at a pre-determined frequency, an optimal water flow in the modeled water distribution comprising selected connections between selected nodes according to the constraints and the dependencies by using the costs of water production, the slack variable, the received sensor data within the validity period, the user data and the historical data.

The result of running the linear program optimization by the optimizer may be the optimal water flow. The optimal water flow may be a route for water to flow in the water distribution system. The data may be collected and combined to feed the optimizer before performing the linear program optimization. The sensor data, the user entered data, the configured data, and historical data may be retrieved from the database and may be combined. Each data record of the sensor data, the user entered data, the configured data and historical data may have validity period associated with it. Also, constraints and dependencies may be determined and fed to the optimizer. The water production costs may also be considered constraints and fed to the optimizer. The slack variable may be created to represent the unmet demand for the water supply and may also be used by the optimizer to perform the linear program optimization.

The linear program optimization may be performed frequently. For example, the program may be executed every fifteen (15) minutes. The linear program optimization may dynamically determine an optimal route for the water flow in the water distribution network. The optimal route for the water flow may be saved in a file to be displayed in a graphical user interface.

Step 170: Determining a production plan. Examples for step 170 may include: determining a water production plan for the water distribution network according to the determined optimal water flow and displaying the water production plan in a second user interface.

The water production plan may be determined by using the optimal route for the water flow in the water distribution network that may be determined by the linear program optimization. The production plan may include how much water is produced at one or more water treatment works for a time period in the future (ten (10) days for example). The production plan may be displayed in a graphical user interface. Alternatively, the production plan may be saved in the file.

The method shown in FIG. 1 may include a note that represents a water main supply line in the water distribution network. The water main supply line may refer to the big water supply pipe that may be owned and maintained by a water company. When determining the optimized water flow for water production control, the water flow in small water supply pipes in individual houses may not be important. There may be too many small water supply pipes and may be too many unknowns for the water flow in the small water supply pipes in individual houses. Therefore, it may not be possible to track water flows in small water supply pipes. As such, the determination of the optimized water flow may focus on the water main supply line. The inflow and outflow of the water main supply line and the water amount in the water main supply line may be important for the water production control. The water main supply line may be considered as a tank of water.

The method shown in FIG. 1 may include a node that represents a water supply production that may include a pumping station. The water supply production having a pumping station may be represented as a node in the water distribution network.

The water distribution network model as disclosed in the method shown in FIG. 1 may include receiving the sensor data at a pre-determined interval and updating the water distribution model according to the received sensor data. The water distribution network model may be a dynamic model. The model may change from time to time. The received sensor data and or received user data may affect the model. Therefore, each time when the user data and/or sensor data are updated, the model may be also updated. As such, the frequency to modify the model may relate to the pre-determined time interval that the sensor data and/or the user data are updated. The pre-determined time interval may be every 15 minutes. Some other time interval to modify the model may also be used. The time interval may be an event driven time interval. For example, the model may be regenerated upon the change of the user data or the sensor data. The modification of the model may also occur upon the change the configured data.

The costs of water production, the slack variable, the received sensor data, the user data and the historical data as disclosed in the method shown in FIG. 1 may comprise configurable values that are adjustable via a graphical user interface.

The planner for controlling the water production may adjust data as needed. The cost of water production at each water treatment works, the slack variable, the received sensor data, the user data and the historical data may be adjusted by the water production planner. The adjustable data may be configurable values for the water production control. The planner may adjust the configurable values by using a graphical user interface. However, the adjustment may also be made automatically by using a computer program.

The method shown in FIG. 1 may further include a sub-step of validating the received sensor data, the received historical data and the received user data by using at least one pre-determined criterion. The sub-step of validating may further include a sub-step of replacing invalid data by using an intelligent substitute.

The received data may be checked for validity. The received data may include sensor data, the received historical data, the received user data or the configured data. The validity check may be performed for the received data. For example, if the received sensor data record does not have a water amount for a pumping station, the received sensor data record may not be valid. The valid data record may not be used for the further data processing. However, certain invalid data may be fixable. For example, if the validity period for a sensor data record for the water amount of a pumping station is missing, the system date may be used as the validity period to fix the invalid data record.

The replacement of invalid values in the data records with valid values by using a mapping table may be called intelligent substitute. The mapping table may be used for fixing the invalid data records. Valid values may be provided in the mapping table for invalid values received in the data records. Valid values in the mapping table may be used to replace the invalid values. For example, when a data record for the daily water amount received for a pumping station exceeds a certain threshold, the mapping table may provide a suggest daily water amount for the pumping station, the invalid water amount value in the data record may be replaced by using the amount in the mapping table. Sometimes, some known invalid data records may exist, for example, certain license limits may no longer be valid and the new license limits may be provided in the mapping table. As such, rather than changing all invalid values for the data stored in the database, the mapping table may be used to replace the invalid values with valid values.

The costs of water production, the slack variable, the received sensor data, the user data and the historical data as disclosed in the method shown in FIG. 1 may become new historic data and may be stored in the historical data repository for modeling the water distribution network at a future time.

The boundary between the historical data and non-historical data may be set dynamically. For example, any data that older than fifteen (15) minutes, two (2) hours, six (6) hours, or twenty-four (24) hours may be considered the historical data. As such, the costs of water production, the slack variable, the received sensor data, the user data, and/or configured data may become new historic data and may be stored in the historical data repository for modeling the water distribution network at a future time.

The determined production plan as disclosed in the method shown in FIG. 1 may be saved to a CSV file triggered by a user.

Figure 2:
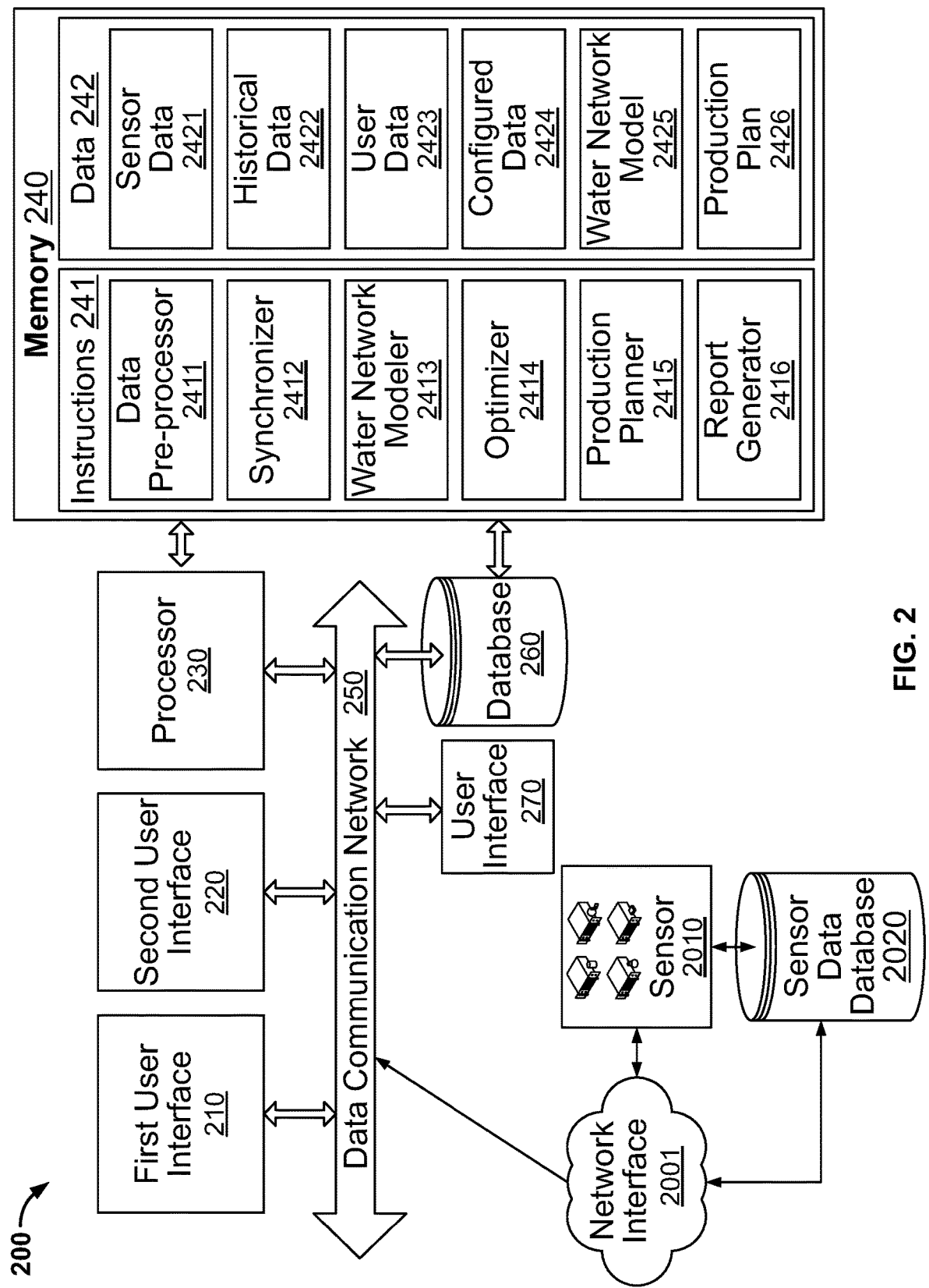
FIG. 2 illustrates one embodiment of a system for water production control for a water distribution network.

FIG. 2 illustrates one embodiment of a system for water production control for a water distribution network 200. As shown in FIG. 2, the system 200 may include one or more processors 230, the first user interface 210, the second user interface 220, the user interface 270, the database 260 and the memory 240. The data communication network 250 may be used to connect the one or more processors 230, the first user interface 210, the second user interface 220, the user interface 270, the database 260, and the memory 240. The memory 240 may include instructions 241 and the data 242. The instructions 241 may include data pre-processor 2411, synchronizer 2422, water network modeler 2413, optimizer 2414, production planner 2415 and report generator 2416. The data 242 may include sensor data 2421, historical data 2422, user data 2423, configured data 2424, water network model 2425 and production plan 2426. Sensors 2010 and sensor data database 2020 may connect to each other and may also connect to the data communication network 250 of the system 200 via network interface 2001 individually. As shown in FIG. 2, the system 200 may get sensor data from sensors 2010 directly or may retrieve sensor data database 2020 to obtain sensor data.

One example implementation of the system 200 may include one or more processors 230 and the non-transitory computer readable medium (memory) 240 storing computer instructions 241 of the data pre-processor 2411 that may be configured to cause the one or more processors 230 to: query, at a pre-determined time interval, sensor data 2421 stored in an industrial control database 2020, receive the sensor data 2421 and assigning a validity period for the received sensor data 2421, receive user data 2423 from a first user interface 210 wherein the user data 2423 represents a demand for water, query historical data 2422 comprising historical asset attributes and historical sensor data from a historical data repository 260.

The system 200 may also include computer instructions 241 of water network modeler 2413 that may be configured to cause the one or more processors 230 to: model the water distribution network as nodes and connections between nodes.

The system 200 may further include computer instructions 241 of synchronizer 2412 that may be configured to cause the one or more processors 230 to: determine constraints and dependencies among the nodes in the water distribution network, determine costs of water production for the water distribution network, and add a slack variable when a demand for water exceeds a supply of water to the nodes.

The optimizer 2414 of the system 200 may include instructions that may cause the one or more processors 230 to determine, at a pre-determined frequency, an optimal water flow 2425 in the modeled water distribution comprising selected connections between selected nodes according to the constraints and the dependencies by using the costs of water production, the slack variable, the received sensor data within the validity period, the user data and the historical data. The production planner 2415 and the report generator 2416 of the system 200 may include instructions that may cause one or more processors 230 to determine a water production plan 2426 for the water distribution network according to the determined optimal water flow and display the water production plan in a second user interface 220.

The water network model 2425 of the system 200 may include a node that may represent a water main supply line in the modeled water distribution network.

The water network model 2425 of the system 200 may include a node that may represent a water supply production which may include a pumping station in the water distribution network.

The water network modeler 2413 of the system 200 may include instructions that may be configured to cause one or more processors 230 to update the water distribution network model according to the received sensor data 2421 at the pre-determined time interval.

The system 200 may further include a graphical user interface 270 that may be used to adjust the configurable values of data which may include the costs of water production (part of water network model 2425), the slack variable (part of water network model 2425), the received sensor data 2421, the user data 2423, the historical data 2422, and configured data 2424.

The data pre-processor 2411 of the system 200 may include instructions that may be configured to cause the one or more processors 230 to validate the received sensor data 2421, the received historical data 2422 and the received user data 2423 by using at least one pre-determined criterion. The data pre-processor 2411 of the system 200 may include instructions that may be configured to further cause the one or more processors 230 to replace invalid data by using an intelligent substitute as described above.

The costs of water production and the slack variable, both of which may be part of water network model 2425, the received sensor data 2421, the user data 2423 and the historical data 2422 that are included in the system 200 may become new historic data and may be stored in the historical data repository 260 for modeling the water distribution network at a future time.

The report generator 2416 of the system 200 may include instructions that may be configured to cause the one or more processor 230 to save the determined production plan 2426 to a CSV file. The activity of saving the determined production plan 2426 may be triggered by a user via a user interface 270.

Figure 3:
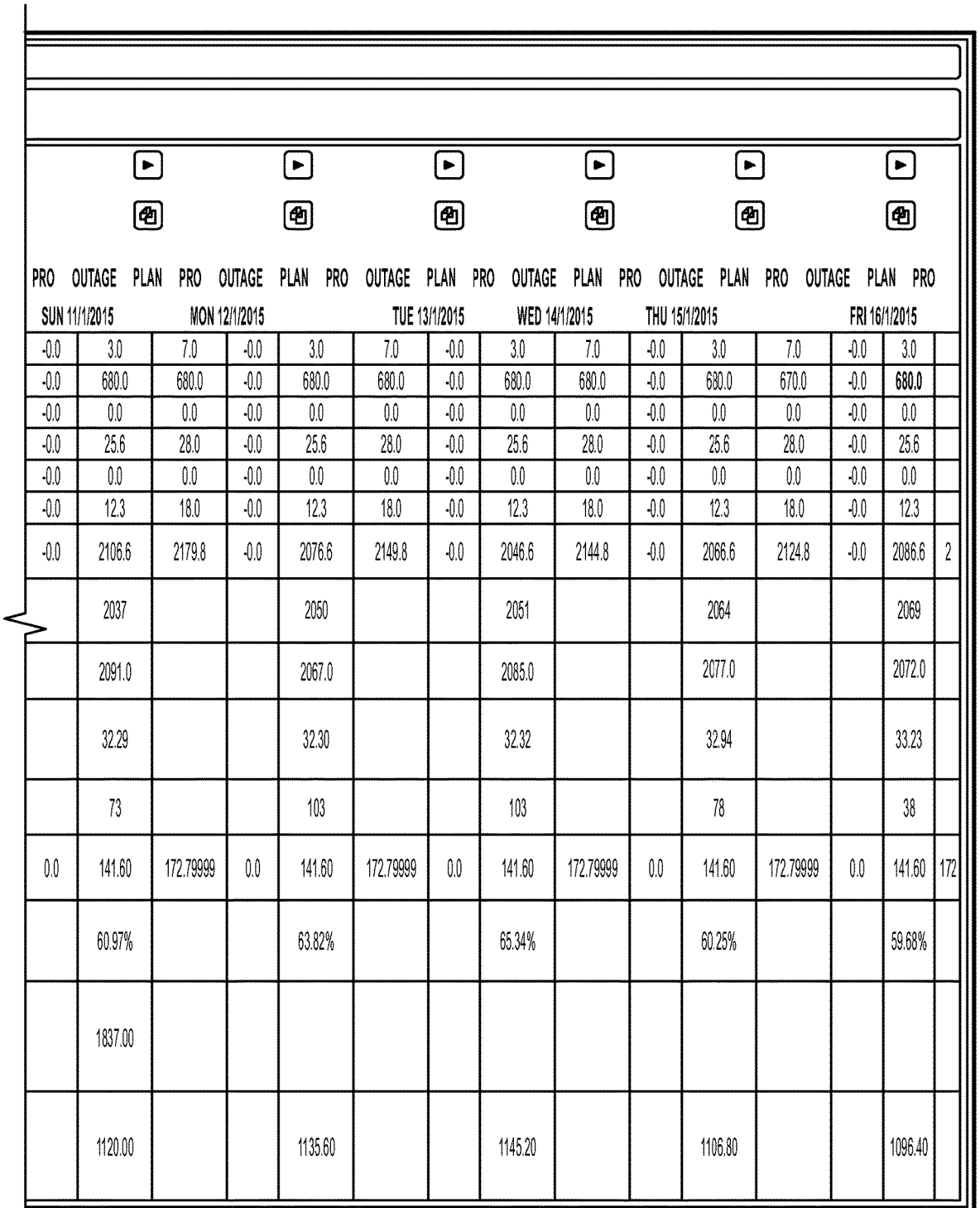
FIG. 3 illustrates one embodiment of a user interface for the water production plan.

FIG. 3 illustrates one embodiment of a user interface for the water production plan 300. As shown in FIG. 3, the water production plan may set a 10 day plan targets 310. The plan period 320 may also be shown in FIG. 3. The user interface 300 may allow the production planner to export the plan 330 and export the optimal route 340 to a file that may be saved in the computer readable medium (not shown). The user interface of the production plan 300 may show site name 345 of water treatment works (WTW) for the production control. By each site name 345, the default cost 350, unit cost of WTW 352, optimal production 353, actual 24 hour rolling production 354, today's declared production 355, seasonal expected production availability 356 and 90 day best historic actual production 357 are shown in FIG. 3. For each day planned, production 358, outage 359 and plan production 360 are shown in FIG. 3. A minimum and maximum selection button 347 and the total FIG. 346 for all WTWs are also shown in the user interface 300.

As shown in FIG. 3, the total cost of production 371, production requirement 372, total production unit cost, forecast demand 374, system unit cost, headroom, SE wells production total 379, SE wells plan total 380, overall strategic SRES storage 382, SRES total actual storage volume 386, Total's headroom 381, max to production headroom 383 and production to plan headroom 385 are displayed in the user interface for the water production control 300. The headroom 381 may define the amount of spare capacity within a system, specifically the difference between supply and demands within that system. For example, if the network/site has a capacity of 300, but demand is 200, then the headroom may be 100. A Service Reservoir may store treated potable water that is ready for distribution. The SRES Storage 382 may indicate how much water may be stored within the Service Reservoir.

As shown FIG. 3, the production planner may adjust values in the user interface 300 and regenerate the water production plan.

Figure 4:
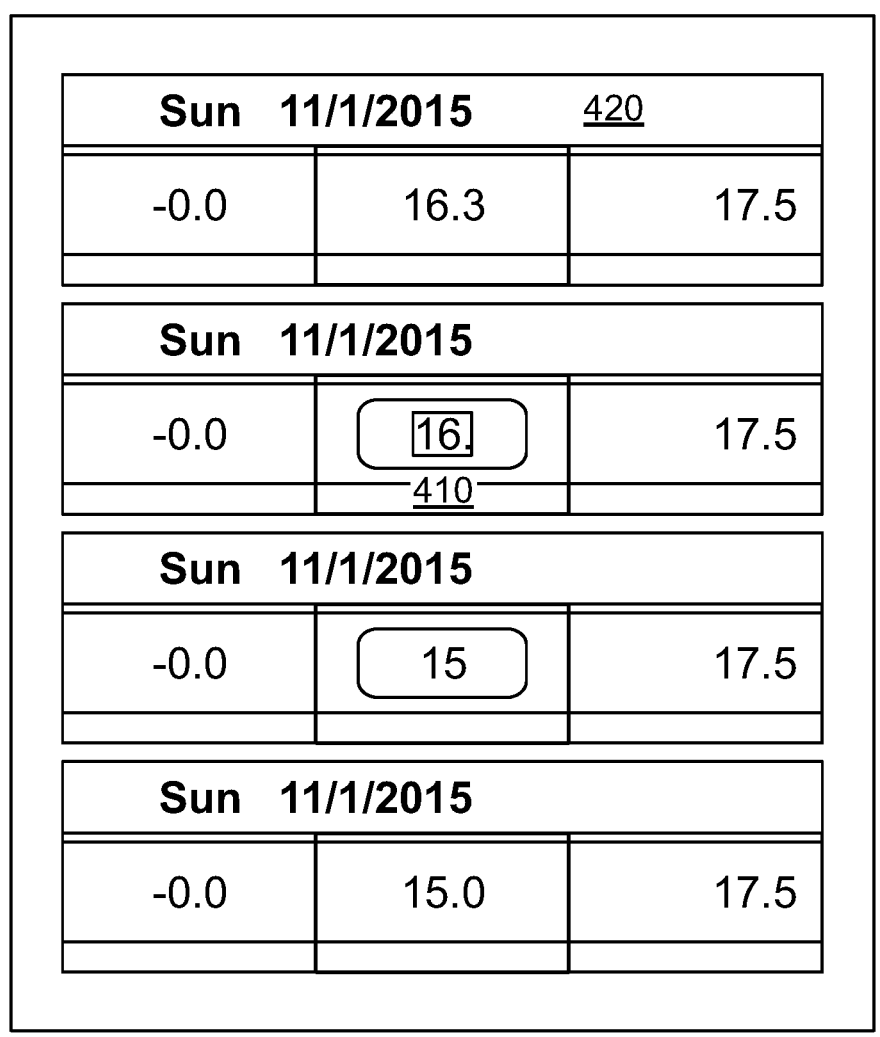
FIG. 4 illustrates another embodiment of a user interface to receive the user data input.

FIG. 4 illustrates another embodiment of a user interface to receive the user data input 400. As shown in FIG. 4, the date for the user input 420 is displayed. The user data input field 410 in FIG. 4 may allow the user to input the water usage figure. The minimum and maximum usage amounts are displayed on both sides of the user input field 420 in FIG. 4. In FIG. 4, the figures of −0.0 and 17.5 are provided as the example value range for the user input.

Figure 5:
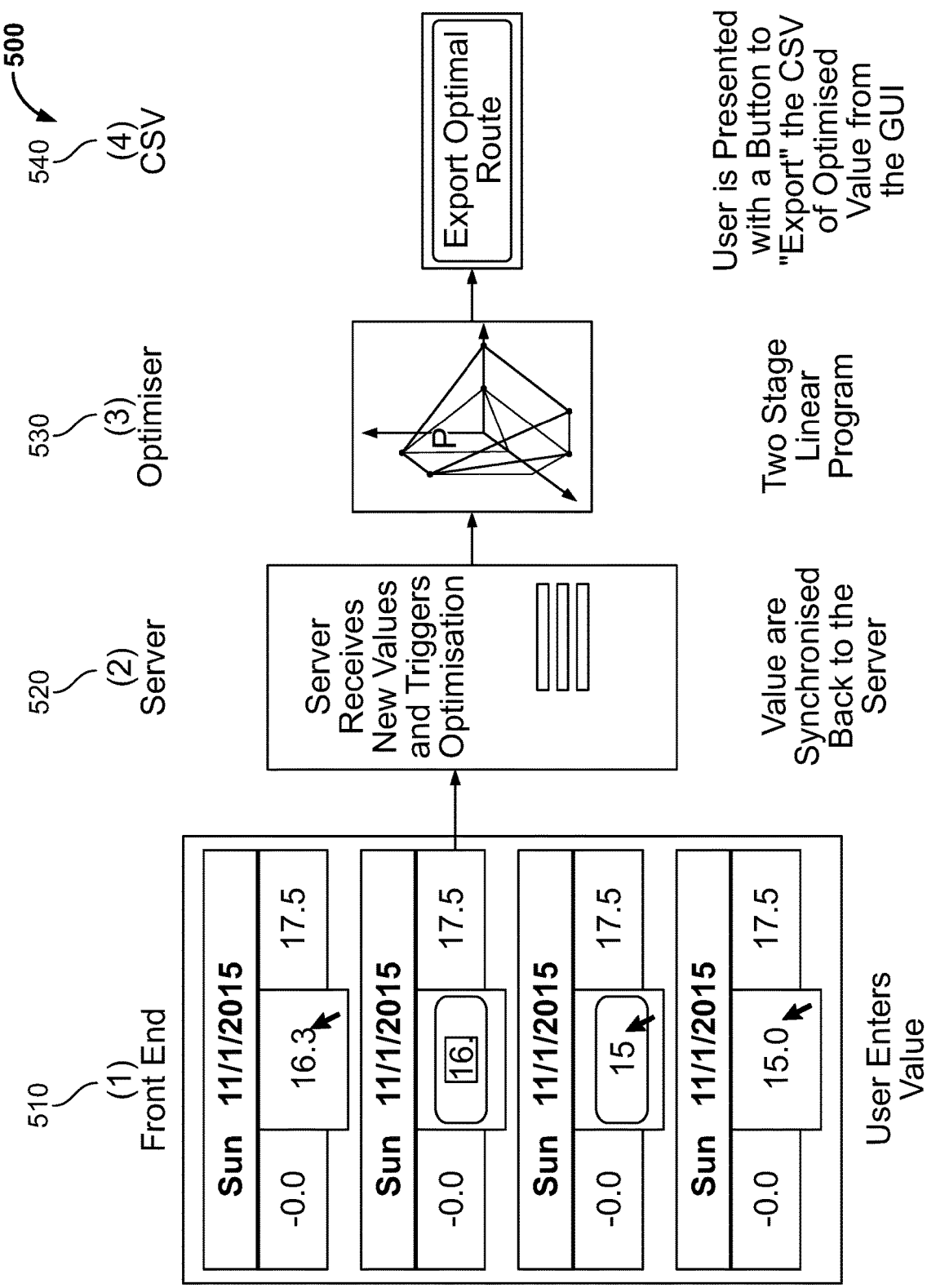
FIG. 5 shows one embodiment of a process diagram for a linear program optimization for water production control for a water distribution network.

FIG. 5 shows one embodiment of a process diagram for a linear program optimization for water production control for a water distribution network 500. As shown in FIG. 5, a front end 510 may allow the user to input values. The input value from the front end 510 may be then sent to the server 520. The server 520 may perform a synchronized process to synchronize values from the user input values and other values. The synchronized result may be stored back to the server 520. The server 520 may receive new user input values from the front end 510 and trigger the optimization by feeding data to the optimizer 530. The optimizer 530 may perform optimization by using a two stage linear program. The optimized route may be created by the optimizer 530 and may be exported 540 to a CSV file. The export may be triggered by a user to push an "Export Optimal Route" button 340 in the user interface as shown in FIG. 3.

Figure 6:
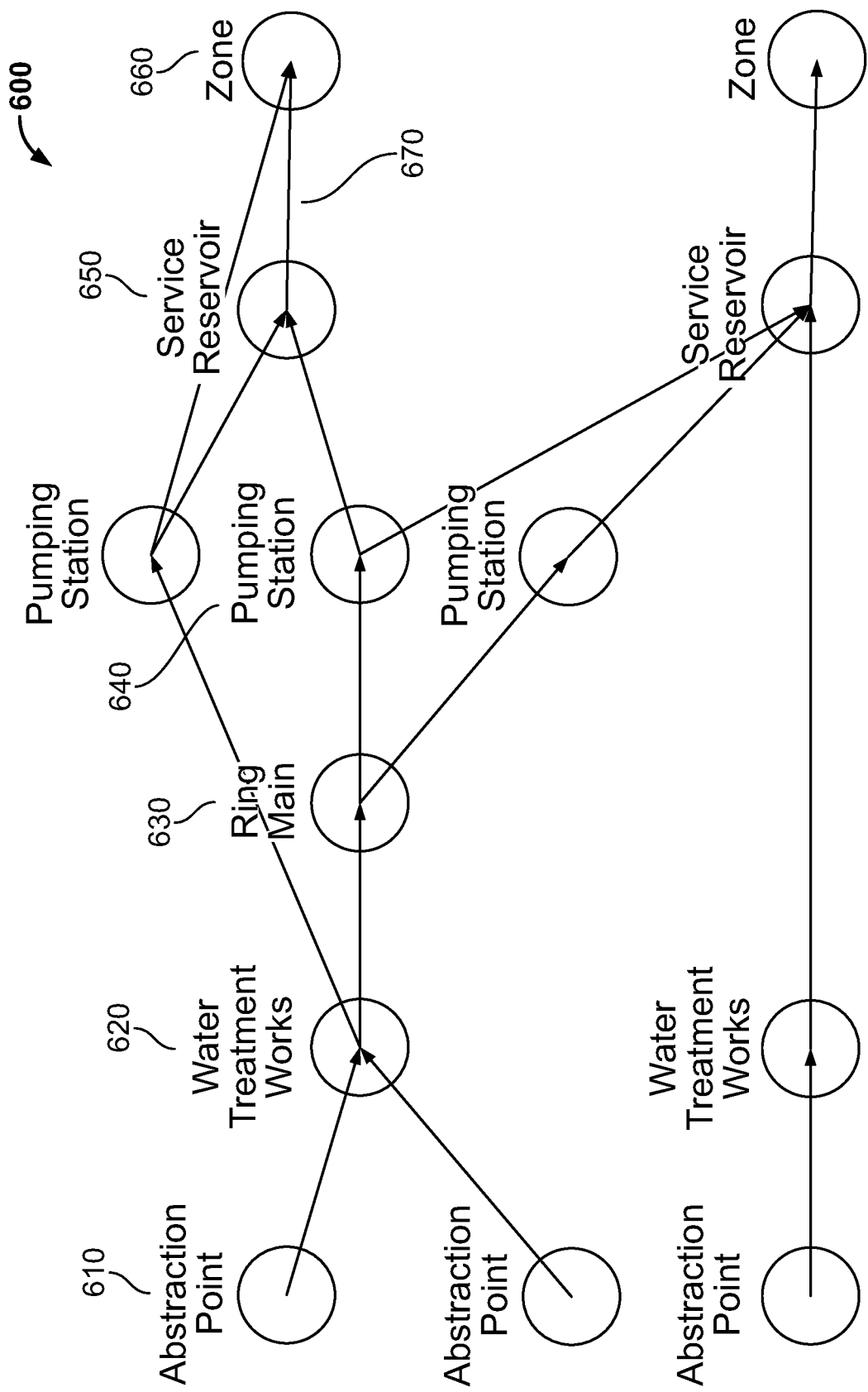
FIG. 6 visually depicts a simplified example network topology modeled for a water distribution network.

FIG. 6 visually depicts a simplified example network topology modeled for a water distribution network 600. As shown in FIG. 6, the water distribution network may include nodes of abstraction point 610, water treatment works 620, ring main 630, pumping station 640, service reservoir 650, and zone 660. The connection 670 may be established between nodes. However, because constraints and dependencies may restrict connections between some nodes in the water distribution network, not every two nodes may be able to connect with each other in the water distribution network.

FIGS. 7-10 show one embodiment of a data processing flowchart for water production control. The data processing flowchart shown in FIGS. 7-10 may illustrate the preparation of the data for performing the linear programming optimization.

Figure 7:
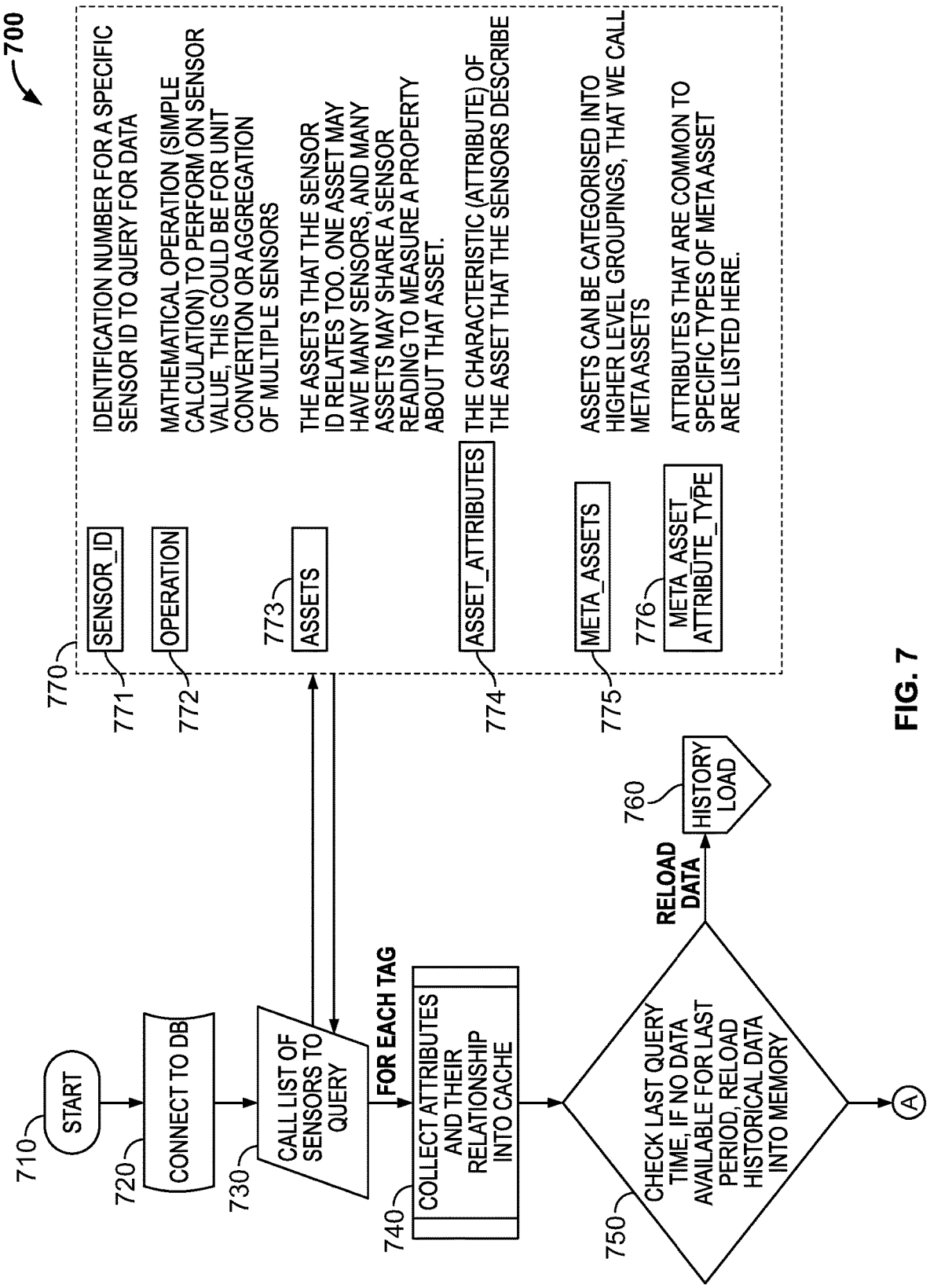
FIGS. 7-10 shows one embodiment of a data processing flowchart for water production control.

FIG. 7 shows part 1 of the embodiment of the data processing flowchart for water production control 700. As shown in FIG. 7, after the process starts 710, the connection to database 720 may be needed. The data processing may needs to collect sensor data for water production control, a list of sensor data to be queried are listed 730. As shown in FIG. 7, the sensor data to be collected may include sensor identification (ID) 771, operation 772, assets 773, asset attributes 774, meta assets 775, meta asset attribute type 776. The sensor id 771 may be identification number for a specific sensor ID to query for data. The operation 772 may be mathematical operation (simple calculation) to perform on sensor values. The operation 772 may be for unit conversion or aggregation of multiple sensors. The assets 773 may be the assets that the sensor ID may relate to. One asset may have many sensors, and many assets may share a sensor reading to measure a property about that asset. The asset attributes 774 may be the characteristic (attribute) of the asset that the sensors describe. The meta assets 775 may be assets that can be categorized into higher level groupings. The meta asset attribute type 776 may be attributes that are common to specific types of meta asset that are listed here.

Further, as shown in FIG. 7, for each tag of sensor data to be collected, attributes and relationships of sensor data to other data may be collected into the cache memory 740. Also, the check may be made regarding last query time. If no data are available for the last period, the data process may reload the historical data into memory 750. The reload of history data 760 is shown as a separate process in FIG. 7.

Figure 8:
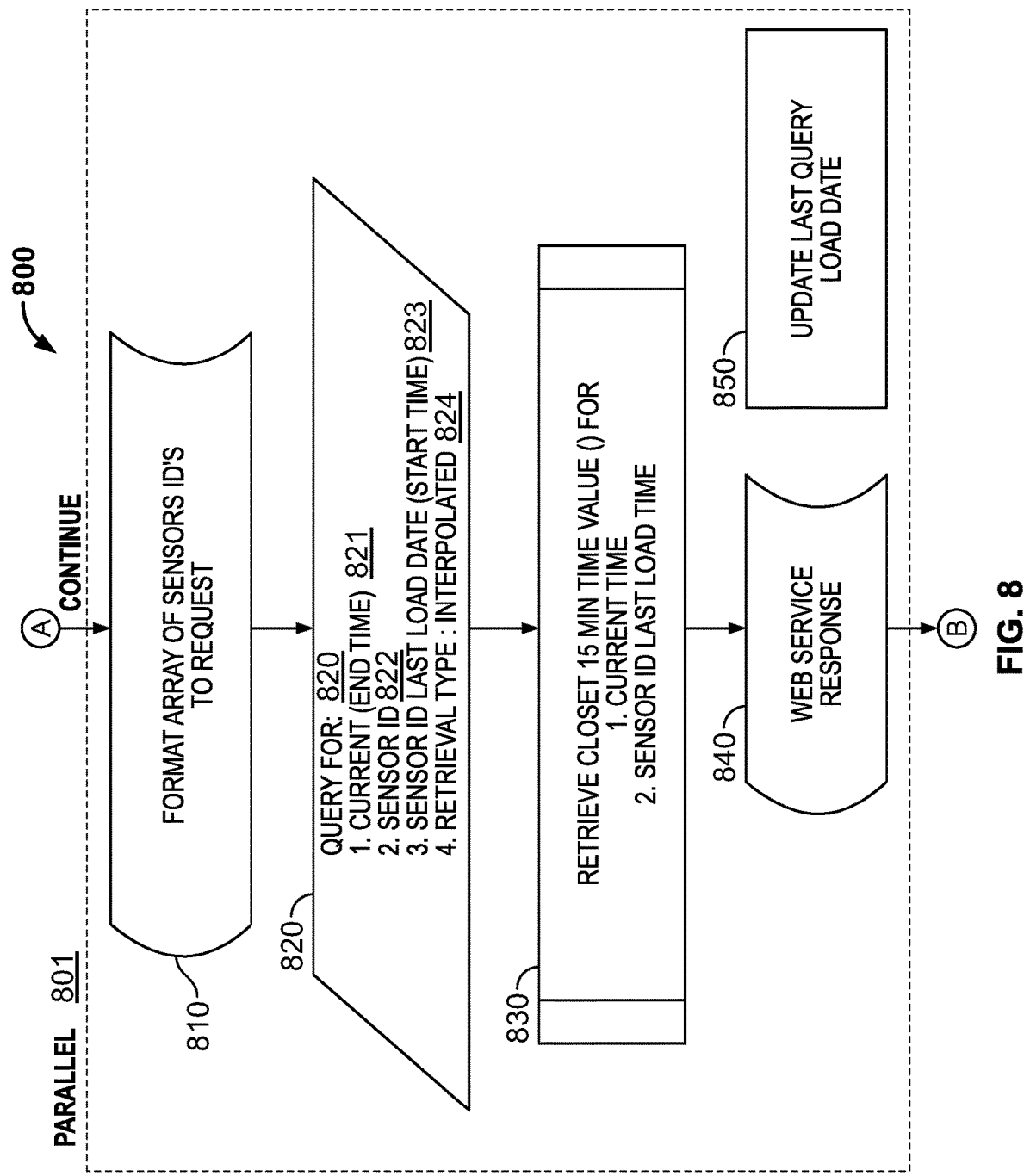

FIG. 8 shows part 2 of the embodiment of the data processing flowchart for water production control 800. FIG. 8 illustrates the process for retrieving sensor data. As shown in FIG. 8, multiple retrievals for sensor data may be performed in parallel 801. First, the format array of sensor IDs to be requested 810 is formed. The query 820 may be made with following criteria: current time (end time) 821, sensor id 822, the sensor last load date/time (start time) 823 and retrieval type (interpolated) 824.

The retrieval type 824 may be either "Interpolated" or "Actual" though the retrieval type 824 may be other types. When a reading of the retrieval type 824 is "Actual" for a specific time stamp, then the reading returned by the query may be a value that the specified measuring sensor directly read and recorded. When a reading of the retrieval type 824 is "Interpolated", then the query may return an interpolated value. Measuring sensors record in discrete intervals that are usually appropriate for the signal being read. It may be understood mathematically (e.g. in Fourier Transform literature) when it may be acceptable to interpolate values and when interpolation may not be appropriate. In the present disclosure, choosing Interpolated may be useful because it may avoid excessive null/blank values and may return the "Actual" values if the timestamp specified coincides with the time that an actual reading and recording was made.

The sensor data retrieval process as shown in FIG. 8 may retrieve the sensor data at every 15-minute time interval. The 15-minute time interval may be defined as either the closest fifteen (15) minutes from the current time or fifteen (15) minutes from the last sensor data load time for the sensor id 830. After the sensor is retrieved, a web service response 840 may trigger the update of the last query load date 850 as shown in FIG. 8.

The starting time for the 15-minute interval may be determined by: (1) the timestamp (mm:ss.ms) at which the last reading in a batch was received, or (2) the time that the historian takes to perform interpolation and remedial action.

In the event the 15 minute internal is determined by the timestamp, the last reading in the batch received may be used. Data may be usually received and processed in a serial format by the source system that the data are queried from. If there are 1,000 sensors, whilst they all may have been recorded at the same time, they may not be written into the source database at the same time. For example, if readings start to be received at 12:15:00.00 (hh:mm:ss.ms), then they might not finish writing until 12:15:30.00. As such, the last reading 12:15:30.00 would be used for determining 15-minute time interval. Once data has finished writing at 12:15:30.00, an interpolation job may be triggered that may pre-compute ranges of interpolated values. By this way, queries for interpolated values may be able to meet pre-specified performance measures.

Figure 9:
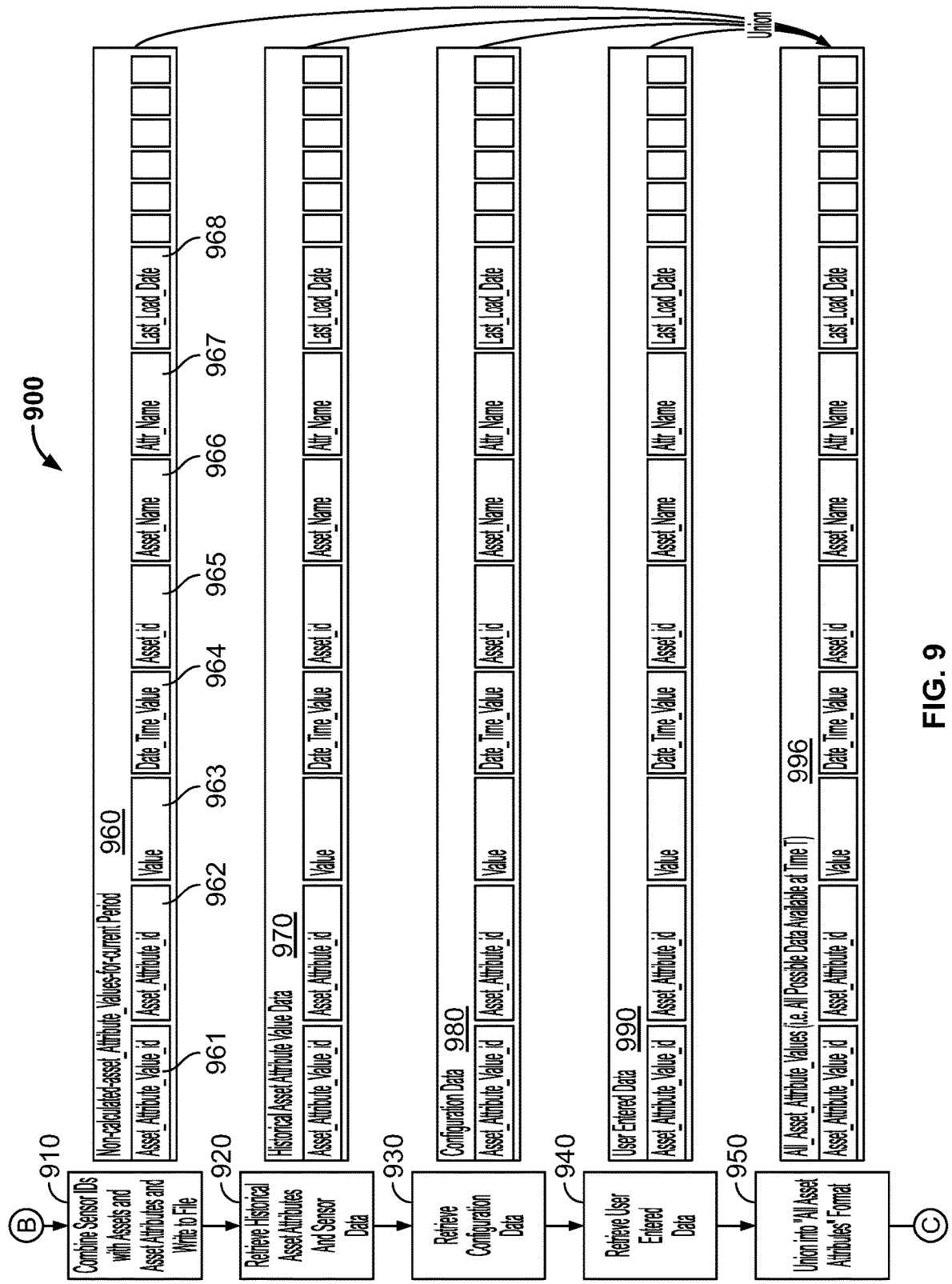

FIG. 9 shows part 3 of the embodiment of the data processing flowchart for water production control 900. After the sensor data is retrieved, the process may combine the sensor data with sensor Ids with assets and asset attributes and write them to the file 910. The sensor data record 960 may include data fields of asset_attribute_value_id 961, asset_attribute_id 962, value 963, data_time_value 964, asset_id 965, asset_name 966, attr_name (attribute name) 967, and last_load_date 968. As shown in FIG. 9, historical data 970, configuration data 980, user data 990 and all asset attribute values 996 may share the same data field format of the sensor data record 960.

As shown in FIG. 9, the process retrieve historical asset attributes and sensor data 920 after combining the sensor data with sensor Ids with assets and asset attributes and writing to the file 910. Subsequently, the data process retrieve configuration data 930, retrieve user-entered data 940. The sensor data with sensor ids 960, historical asset attribute value data 970, configuration data 980 and user entered data are all union into "all asset attribute" format 950 as shown in FIG. 9.

Figure 10:
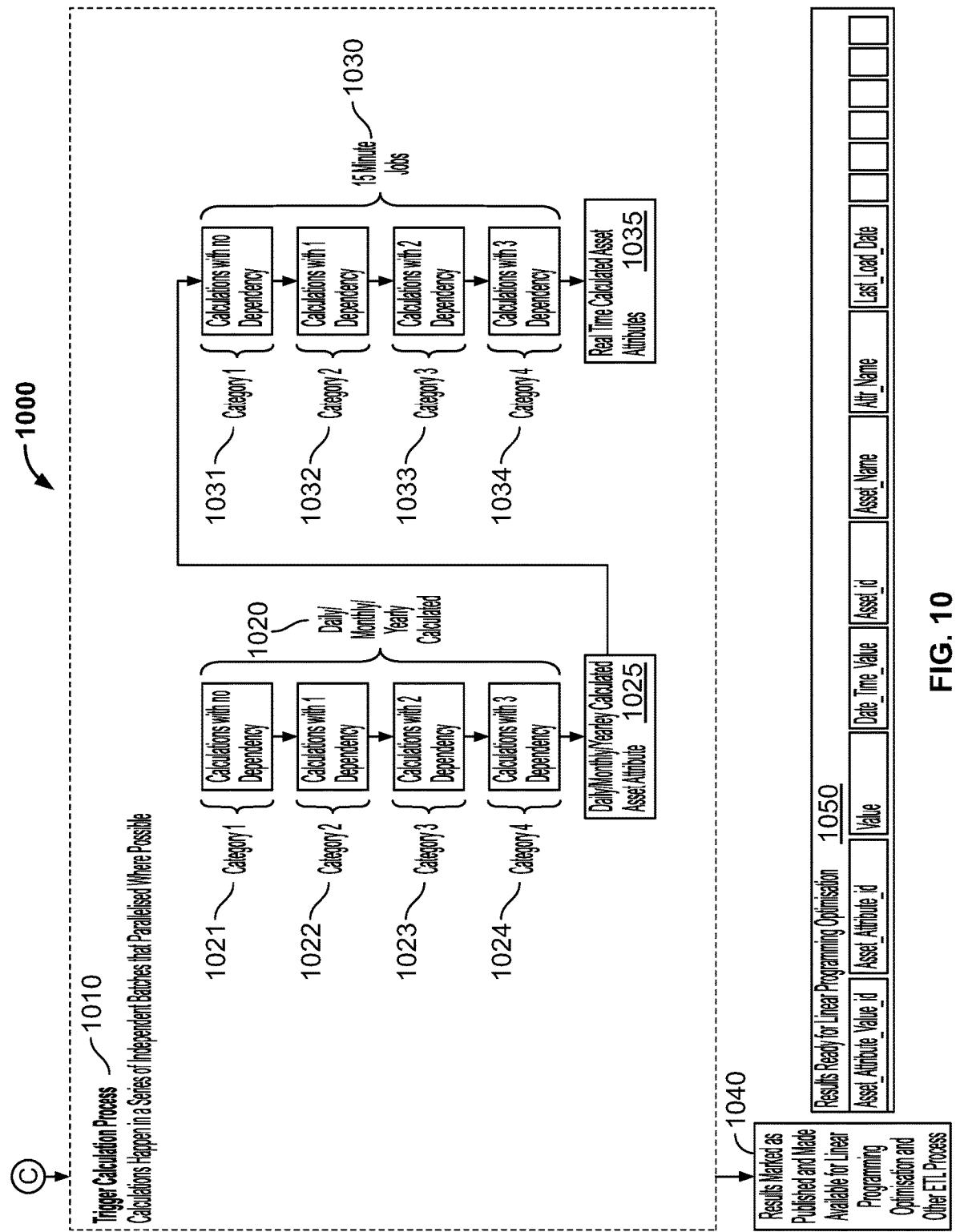

FIG. 10 shows part 4 of the embodiment of the data processing flowchart for water production control 1000. As shown in FIG. 10, the data process triggers the calculation process 1010. The calculations may happen in a series of independent batches that may be parallelized where possible. Daily/monthly/yearly calculation 1020 may have four (4) categories: category 1 1021, category 2 1022, category 3 1023 and category 4 1024. Category 1 1021 may be calculations with no dependency. Category 2 1022 may be calculations with one (1) dependency. Category 3 1023 may be calculations with two (2) dependencies. Category 4 1024 may be calculations with three (3) dependencies. Daily/Monthly/Yearly calculated asset attribute 1025 may be created after daily/month/yearly calculation 1020 is performed.

15 minute jobs 1030 may also have four (4) categories: category 1 1031, category 2 1032, category 3 1033 and category 4 1034. Category 1 1031 may be calculations with no dependency. Category 2 1032 may be calculations with one (1) dependency. Category 3 1033 may be calculations with two (2) dependencies. Category 4 1034 may be calculations with three (3) dependencies. Real time calculated asset attributes 1035 may be created after 15 minute jobs 1030 are performed.

FIG. 10 also shows results marked as published and made available for linear programming optimization and other ETL processes 1040. The results 1040 may be created after the calculation process 1010 is performed. Data records for results ready for linear programming optimization 1050 may have the same format as the sensor data format 960 shown in FIG. 9.

Extract Transform Load (ETL) may be a process within database usage that describes how data may be extracted from one or more sources, transformed either by a calculation or having its format changed and then loaded into a final target store, usually another database.

The "Results marked as published and made available for Linear Programming Optimization and other ETL Processes" 1040 in FIG. 10 may refer to how the results of complex calculations may have their format transformed and then written into various "front-end" databases. ETL process may have been performed where the calculations may be the transformation step. Realistically transformation as described in ETL may be usually significantly simpler. Such transformation is a one step process, not the multi-stage calculations. Specifically, different pieces of our front end may require the same data in different places. For example data for the historical line charts may be stored in a different location to the Point-of-Interest markers that appear on the map. ETL process may not always be used; other front end technologies may also be used.

Figure 11:
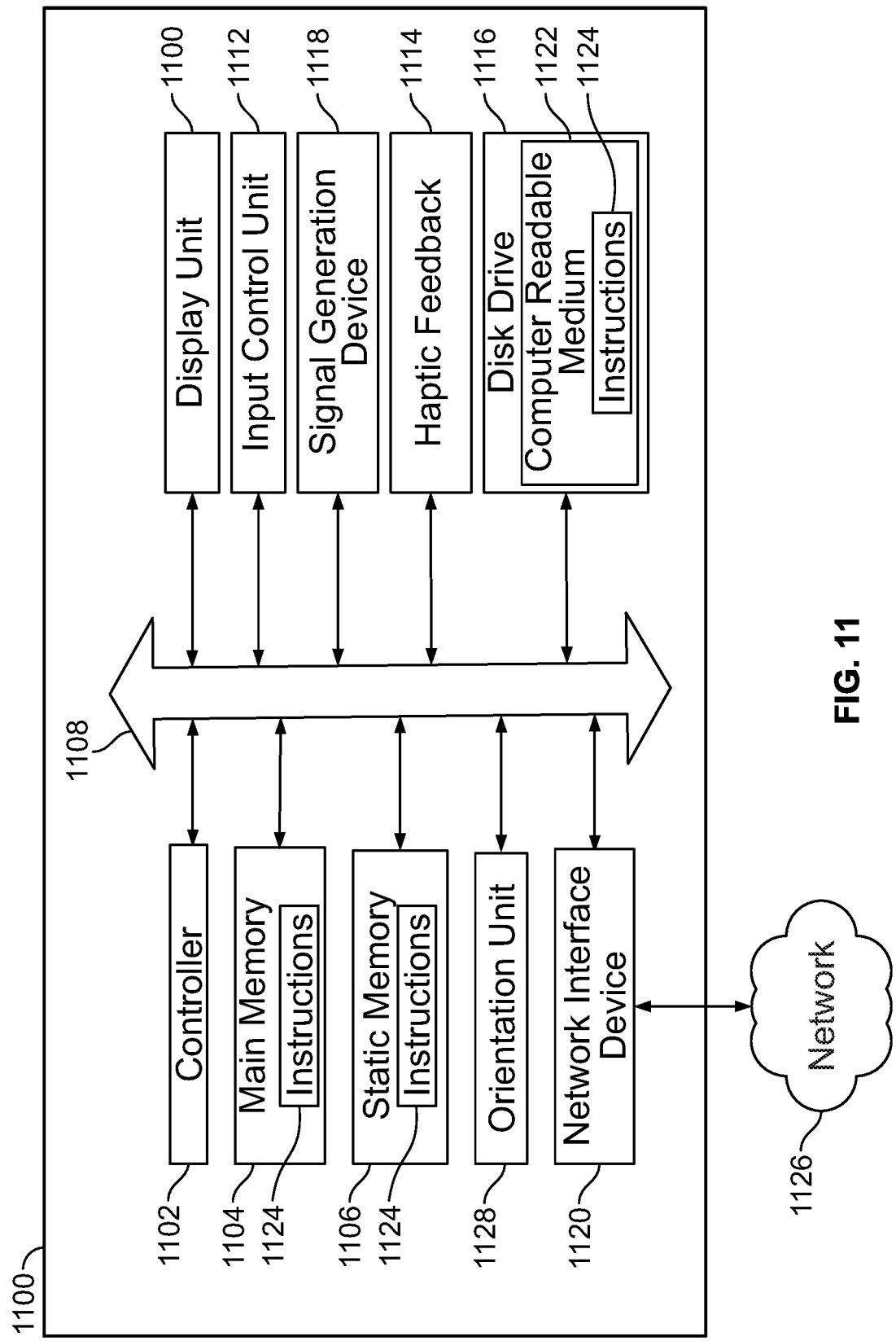
FIG. 11 illustrates an example of a computer system that may be used for water production control for a water distribution network.

FIG. 11 illustrates an example of a computer system that may be used for water production control for a water distribution network. Referring to FIG. 11, an illustrative embodiment of a computer system that may be used for one or more of the components illustrated by the method and system in FIGS. 1-2, or in any other system configured to carry out the methods discussed in this disclosure herein, is shown and is designated 1100. Although the computer system 1100 is illustrated in FIG. 11 as including all of the components as illustrated, it is within the scope of this innovation for the computing system to be comprised of fewer, or more, components than just illustrated in FIG. 11.

The computer system 1100 can include a set of instructions 1124 that can be executed to cause the computer system 1100 to perform any one or more of the methods, processes or computer-based functions disclosed herein. For example, a water production control tool as described herein may be a program comprised of a set of instructions 1124 that are executed by the controller 1102 to perform any one or more of the methods, processes or computer-based functions described herein. Such a program may be stored in whole, or in any combination of parts, on one or more of the exemplary memory components illustrated in FIG. 11, such as the main memory 1104, static memory 1106, or disk drive 1116.

As described, the computer system 1100 may be mobile device. The computer system 1100 may also be connected using a network 1118, to other computer systems or peripheral devices. In a networked deployment, the computer system 1100 may operate in the capacity of a server or as a client user computer in a server-client user network environment, or as a peer computer system in a peer-to-peer (or distributed) network environment. In addition to embodiments in which the computer system 1100 is implemented, the computer system 1100 may also be implemented as, or incorporated into, various devices, such as a personal computer ("PC"), a tablet PC, a set-top box ("STB"), a personal digital assistant ("PDA"), a mobile device such as a smart phone or tablet, a palmtop computer, a laptop computer, a desktop computer, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

As illustrated in FIG. 11, the computer system 1100 may include a controller 1102, such as a central processing unit ("CPU"), a graphics processing unit ("GPU"), or both. Moreover, the computer system 1100 can include a main memory 1104, and additionally may include a static memory 1106. In embodiments where more than one memory components are included in the computer system 1100, the memory components can communicate with each other via a bus 1108. As shown, the computer system 1100 may further include a display unit 1110, such as a liquid crystal display ("LCD"), an organic light emitting diode ("OLED"), a flat panel display, a solid state display, or a cathode ray tube ("CRT"). Additionally, the computer system 1100 may include one or more input devices 1112, such as a keyboard, push button(s), scroll wheel, digital camera for image capture and/or visual command recognition, touch screen, touchpad or audio input device (e.g., microphone). The computer system 1100 can also include signal outputting components such as a haptic feedback component 1114 and a signal generation device 1118 that may include a speaker or remote control.

Although not specifically illustrated, the computer system 1100 may additionally include a GPS (Global Positioning System) component for identifying a location of the computer system 1100.

Additionally, the computer system 1100 may include an orientation unit 1128 that includes any combination of one or more gyroscope(s) and accelerometer(s).

The computer system 1100 may also include a network interface device 1120 to allow the computer system 1100 to communicate via wireless, or wired, communication channels with other devices. The network interface device 1120 may be an interface for communicating with another computer system via a Wi-Fi connection, Bluetooth connection, Near Frequency Communication connection, telecommunications connection, internet connection, wired Ethernet connection, or the like. The computer system 1100 may also optionally include a disk drive unit 1116 for accepting a computer readable medium 1122. The computer readable medium 1122 may include a set of instructions that are executable by the controller 1102, and/or the computer readable medium 1122 may be utilized by the computer system 1100 as additional memory storage.

In a particular embodiment, as depicted in FIG. 11, the disk drive unit 1116 may include a computer-readable medium 1122 in which one or more sets of instructions 1124, such as software, can be embedded. Further, the instructions 1124 may embody one or more of the methods, processes, or logic as described herein. In a particular embodiment, the instructions 1124 may reside completely, or at least partially, within the main memory 1104, the static memory 1106, and/or within the controller 1102 during execution by the computer system 1100. The main memory 1104 and the controller 1102 also may include computer-readable media.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present computer system 1100 may encompass software, firmware, and hardware implementations. The term "module" or "unit" may include memory (shared, dedicated, or group) that stores code executed by the processor.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 1122 that includes instructions 1124 or receives and executes instructions 1124 responsive to a propagated signal; so that a device connected to a network 1118 can communicate voice, video or data over the network 1118. Further, the instructions 1124 may be transmitted or received over the network 1118 via the network interface device 1120.

While the computer-readable medium 1124 is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium 1122 can include a solid-state memory such as a memory card or other package that houses one or more non-volatile read-only memories, such as flash memory. Further, the computer-readable medium 1122 can be a random access memory or other volatile re-writable memory. Additionally, the computer-readable medium 1122 can include a magneto-optical or optical medium, such as a disk or tapes or other storage device to capture information communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium 1122 or a distribution medium and other equivalents and successor media, in which data or instructions may be stored. The computer readable medium may be either transitory or non-transitory.

Although the present specification describes components and functions that may be implemented in particular embodiments with reference to particular standards and protocols commonly used by water and waste companies and broader resources and utilities institutions, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It is to be understood that, all examples provided above are merely some of the preferred examples of the present disclosure. For one skilled in the art, the present disclosure is intended to cover various modifications and equivalent arrangements included within the principle of the disclosure.

The invention claimed is:

1. A method of water production and distribution control for a water distribution network, comprising:

querying, at a pre-determined time interval, sensor data stored in an industrial control database;

receiving the sensor data and assigning a validity period for the received sensor data;

receiving user data from a first user interface wherein the user data represents a demand for water;

querying historical data comprising historical asset attributes and historical sensor data from a historical data repository;

modeling the water distribution network as nodes and connections between nodes, the modeled water distribution network defining variable for each node and pipe connections that link nodes together, wherein a water main supply line is represented as a node in the modeled water distribution network, and wherein a water supply production comprising a pumping station is represented as a node in in the modeled water distribution network;

determining constraints and dependencies among the nodes in the modeled water distribution network, one of said constraints being hydraulic water flow in the network, a change in the hydraulic water flow being reflected by a variable change in the modeled water distribution network;

determining costs of water production for the water distribution network;

adding a slack variable when a demand for water exceeds a supply of water to the nodes, the slack variable representing an unmet demand for the supply of water;

determining, at a pre-determined frequency, an optimal water flow in the modeled water distribution network comprising the flow of water through selected connections between selected nodes according to the constraints and the dependencies by using the costs of water production, the slack variable, the received sensor data within the validity period, the user data and the historical data; and determining a water production plan for the water distribution network according to the determined optimal water flow and displaying the water production plan in a second user interface;

wherein the modeled water distribution network comprises receiving the sensor data at the pre-determined time interval and updating the modeled water distribution network according to the received sensor data.

2. The method of claim 1, wherein the costs of water production, the slack variable, the received sensor data, the user data and the historical data comprises configurable values that are adjustable via a graphical user interface.

3. The method of claim 2, further comprising: using the graphical user interface to adjust at least one of: the costs of water production, the slack variable, the received sensor data, the user data and the historical data.

4. The method of claim 3, further comprising: determining an updated water production plan for controlling the water production after adjusting the at least one of: the costs of water production, the slack variable, the received sensor data, the user data and the historical data.

5. The method of claim 1, further comprising: validating the received sensor data, the received historical data and the received user data by using at least one pre-determined criterion.

6. The method of claim 3, further comprising: replacing invalid data by using an intelligent substitute.

7. The method of claim 1, wherein the costs of water production, the slack variable, the received sensor data, the received user data and the received historical data become new historic data and are stored in the historical data repository for modeling the water distribution network at a future time.

8. A system for water production and distribution control for a water distribution network, comprising: a processor and a non-transitory computer readable medium storing processor executable instructions configured to cause the processor to:
query, at a pre-determined time interval, sensor data stored in an industrial control database;
receive the sensor data and assign a validity period for the received sensor data;
receive user data from a first user interface wherein the user data represents a demand for water;
query historical data comprising historical asset attributes and historical sensor data from a historical data repository;
model the water distribution network as nodes and connections between nodes, the modeled water distribution network defining variable for each node and pipe connections that link nodes together, wherein a water main supply line is represented as a node in the modeled water distribution network, and wherein a water supply production comprising a pumping station is represented as a node in in the modeled water distribution network;
determine constraints and dependencies among the nodes in the modeled water distribution network, one of said constraints being hydraulic water flow in the network, a change in the hydraulic water flow being reflected by a variable change in the modeled water distribution network;
determine costs of water production for the water distribution network;
add a slack variable when a demand for water exceeds a supply of water to the nodes, the slack variable representing an unmet demand for the supply of water;
determine, at a pre-determined frequency, an optimal water flow in the modeled water distribution network comprising the flow of water through selected connections between selected nodes according to the constraints and the dependencies by using the costs of water production, the slack variable, the received sensor data within the validity period, the user data and the historical data; and
determine a water production plan for the water distribution network according to the determined optimal water flow and display the water production plan in a second user interface;
wherein the modeled water distribution network is updated according to the received sensor at the pre-determined time interval.

9. The system of claim 8, wherein the costs of water production, the slack variable, the received sensor data, the user data and the historical data comprises configurable values that are adjustable via a graphical user interface.

10. The system of claim 9, wherein the graphical user interface is used for adjusting at least one of: the costs of water production, the slack variable, the received sensor data, the user data and the historical data.

11. The system of claim 10, wherein the processor executable instructions further cause the process to: determine an updated water production plan for controlling the water production after the graphical user interface is used for adjusting the at least one of: the costs of water production, the slack variable, the received sensor data, the user data and the historical data.

12. The system of claim 8, wherein the processor executable instructions further cause the process to: validate the received sensor data, the received historical data and the received user data by using at least one pre-determined criterion.

13. The system of claim 12, wherein the processor executable instructions further cause the process to: replace invalid data by using an intelligent substitute.

14. The system of claim 8, wherein the costs of water production, the slack variable, the received sensor data, the received user data and the received historical data become new historic data and are stored in the historical data repository for modeling the water distribution network at a future time.

15. The method of claim 1, further comprising: determining that a received sensor data exceeds a predetermined threshold, retrieving a mapping table comprising substitute sensor data, replacing the sensor data that exceeds said threshold with corresponding substitute sensor data from the mapping table.

16. The system of claim 8, wherein the processor executable instructions further cause the processor to: determine that a received sensor data exceeds a predetermined threshold, retrieve a mapping table comprising substitute sensor data, replace the sensor data that exceeds said threshold with corresponding substitute sensor data from the mapping table.

17. The method of claim 1, wherein the optimal water flow comprises an an optimal route for the water to flow in the distribution system, the optimal route for the water flow is displayed in a graphical user interface and is exported to a file triggered by a user selecting a button on the graphical user interface.

18. The system of claim 8, wherein the optimal water flow comprises an an optimal route for the water to flow in the distribution system, and the processor executable instructions further cause the processor to: display the optimal route for the water flow in a graphical user interface and export the optimal route to a file when triggered by a user selecting a button on the graphical user interface.

* * * * *